US012755891B2

(12) United States Patent
Saito et al.

(10) Patent No.: US 12,755,891 B2
(45) **Date of Patent: *Oct. 6, 2026**

(54) LAMINATED ELECTRONIC COMPONENT

(71) Applicant: TDK CORPORATION, Tokyo (JP)

(72) Inventors: Noriyuki Saito, Tokyo (JP); Yoshinori Sato, Tokyo (JP); Toru Yoshida, Tokyo (JP); Akira Suda, Tokyo (JP); Akira Nakamura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1042 days.

This patent is subject to a terminal disclaimer.

(21) Appl. No.: 17/708,690

(22) Filed: Mar. 30, 2022

(65) Prior Publication Data

US 2022/0319767 A1 Oct. 6, 2022

(30) Foreign Application Priority Data

Mar. 31, 2021 (JP) ................................ 2021-060362

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01)

(58) Field of Classification Search
CPC .... H01F 27/292; H01F 17/0013; H01F 27/29; H01F 5/04
USPC ................................................. 336/139, 192
See application file for complete search history.

(56) References Cited

U.S. PATENT DOCUMENTS

| | | | | |
|---|---|---|---|---|
| 9,318,256 | B2 * | 4/2016 | Park | H01F 27/2804 |
| 11,227,715 | B2 * | 1/2022 | Hamada | H01F 17/0013 |
| 11,935,700 | B2 * | 3/2024 | Saito | H01G 4/30 |
| 12,626,854 | B2 * | 5/2026 | Maki | H01F 17/0013 |
| 2016/0078997 | A1 * | 3/2016 | Son | H01F 17/0013 174/260 |
| 2016/0099102 | A1 * | 4/2016 | Matsunaga | H01F 27/402 336/105 |
| 2016/0118192 | A1 * | 4/2016 | Fujimura | H01G 4/012 174/260 |
| 2017/0125167 | A1 * | 5/2017 | Kawakami | H01G 4/236 |

(Continued)

FOREIGN PATENT DOCUMENTS

| | | | |
|---|---|---|---|
| JP | H11-103229 A | | 4/1999 |
| JP | 2009038187 A | * | 2/2009 |

(Continued)

*Primary Examiner* — Shawki S Ismail
*Assistant Examiner* — Joselito S. Baisa
(74) *Attorney, Agent, or Firm* — Oliff PLC

(57) ABSTRACT

A laminated electronic component includes an element body formed by laminating an insulating layer and having a bottom surface used as a mounting surface, and side surfaces configured to extend to intersect the bottom surface, and a bottom surface electrode formed on the bottom surface of the element body, wherein the bottom surface electrode includes a first electrode layer and a second electrode layer formed on the element body side from the first electrode layer, the first electrode layer is a resin electrode laminated to cover the second electrode layer, and has a stretched portion configured to extend to the side surface, and a width dimension of the stretched portion is smaller than a width dimension of the first electrode layer on the bottom surface.

2 Claims, 12 Drawing Sheets

(56) References Cited

U.S. PATENT DOCUMENTS

| | | | | |
|---|---|---|---|---|
| 2019/0080846 | A1 | 3/2019 | Yoshida et al. | |
| 2019/0214188 | A1* | 7/2019 | Imada | H01F 27/24 |
| 2019/0304666 | A1* | 10/2019 | Arai | H05K 1/111 |
| 2020/0111603 | A1* | 4/2020 | Sato | H01F 27/292 |
| 2021/0175017 | A1* | 6/2021 | Kobayashi | H01G 4/2325 |
| 2022/0319777 | A1* | 10/2022 | Saito | H01G 4/2325 |

FOREIGN PATENT DOCUMENTS

| | | | |
|---|---|---|---|
| JP | 2019-050279 | A | 3/2019 |
| JP | 2020-061409 | A | 4/2020 |

* cited by examiner 4
5
30
12(3)

*Fig.12*

| CYCLE | | 250 | 500 | 1000 |
|---|---|---|---|---|
| COMPARATIVE EXAMPLE | SUBSTRATE CRACK | 1/8 | 1/8 | 2/8 |
| | TERMINAL BREAKAGE | 0/8 | 2/8 | 4/8 |
| | SOLDER CRACK | 3/8 | 5/8 | 8/8 |
| EXAMPLE | SUBSTRATE CRACK | 0/8 | 0/8 | 0/8 |
| | TERMINAL BREAKAGE | 0/8 | 0/8 | 0/8 |
| | SOLDER CRACK | 0/8 | 3/8 | 7/8 |

LAMINATED ELECTRONIC COMPONENT

CROSS REFERENCE TO RELATED APPLICATIONS

This application claims priority to Japanese Patent Application No. 2021-060362 filed on Mar. 31, 2021, the entire contents of which are incorporated by reference herein.

TECHNICAL FIELD

One aspect of the present disclosure relates to a laminated electronic component.

BACKGROUND

Japanese Unexamined Patent Publication No. 2020-61409 describes a laminated electronic component including an element body which is formed by laminating an insulating layer and has a bottom surface used as a mounting surface, and a bottom surface electrode which is formed on the bottom surface of the element body. The bottom surface electrode includes a first electrode layer and a second electrode layer formed on the element body side from the first electrode layer. In such a configuration, an edge portion of the second electrode layer is covered with an overcoat layer which is a part of the element body, and the first electrode layer is obtained by firing on the second electrode layer which is baked at the same time as the element body.

SUMMARY

In the above-described laminated electronic component, generation of cracks in the element body is suppressed by forming the bottom surface electrode in a two-layer structure including a first electrode layer and a second electrode layer. Meanwhile, the stress of the bottom surface electrode may be relaxed by covering the second electrode layer with a resin electrode. However, since the resin electrode has a poor plating property, it is necessary to secure an electrode area therefor. On the other hand, when the electrode area at a place other than the bottom surface is made too large, an amount of solder on the bottom surface side will decrease. In this case, there arises a problem that stress is likely to act on the bottom surface electrode during mounting.

One aspect of the present disclosure provides a laminated electronic component capable of suppressing generation of cracks in an element body while ensuring a plating property of a bottom surface electrode.

A laminated electronic component according to one aspect of the present disclosure includes an element body formed by laminating insulating layers and having a bottom surface used as a mounting surface, and side surfaces configured to extend to intersect the bottom surface, and a bottom surface electrode formed on the bottom surface of the element body, wherein the bottom surface electrode includes a first electrode layer and a second electrode layer formed on the element body side from the first electrode layer, the first electrode layer is a resin electrode laminated to cover the second electrode layer, and has a stretched portion configured to extend to the side surface, and a width dimension of the stretched portion is smaller than a width dimension of the first electrode layer on the bottom surface.

In the laminated electronic component, the bottom surface electrode includes the first electrode layer and the second electrode layer formed on the element body side from the first electrode layer. Here, the first electrode layer is a resin electrode laminated to cover the second electrode layer. In this way, stress on the bottom surface electrode can be relaxed using the resin electrode as the bottom surface electrode. The first electrode layer has the stretched portion which extends to the side surface. Therefore, a plating property can be improved by increasing an electrode area of the resin electrode. Further, the width dimension of the stretched portion is smaller than the width dimension of the first electrode layer on the bottom surface. That is, the width dimension of the first electrode layer on the bottom surface in which solder is required is larger than the width dimension of the stretched portion on the side surface. Therefore, it is possible to suppress attraction of the solder on the bottom surface to the stretched portion side of the side surface, and thus it is possible to suppress decrease in an amount of solder on the bottom surface. Therefore, since a distance between the bottom surface electrode and a mounting substrate can be secured by a thickness of the solder, stress from the mounting substrate to the bottom surface electrode can be suppressed. Thus, it is possible to suppress generation of cracks in the element body while ensuring the plating property of the bottom surface electrode.

The stretched portion may be disposed on the side surface at a position separated from an upper surface facing the bottom surface. In this case, since the stretched portion is in a state in which the stretched portion does not reach the upper surface and is interrupted, an area of the stretched portion can be further reduced. Therefore, the amount of solder attracted to the side surface side by the stretched portion can be further reduced.

An edge portion of the second electrode layer may be covered with an overcoat layer which is a part of the element body. Thus, when the stress is concentrated in the vicinity of an end portion of the bottom surface electrode, the stress is dispersed to the overcoat layer through a boundary portion between the first electrode layer and the overcoat layer.

According to one aspect of the present disclosure, it is possible to provide a laminated electronic component capable of suppressing generation of cracks in an element body while ensuring a plating property of a bottom surface electrode.

BRIEF DESCRIPTION OF THE DRAWINGS

FIG. 12 is a table showing test results.

DETAILED DESCRIPTION

Figure 1:
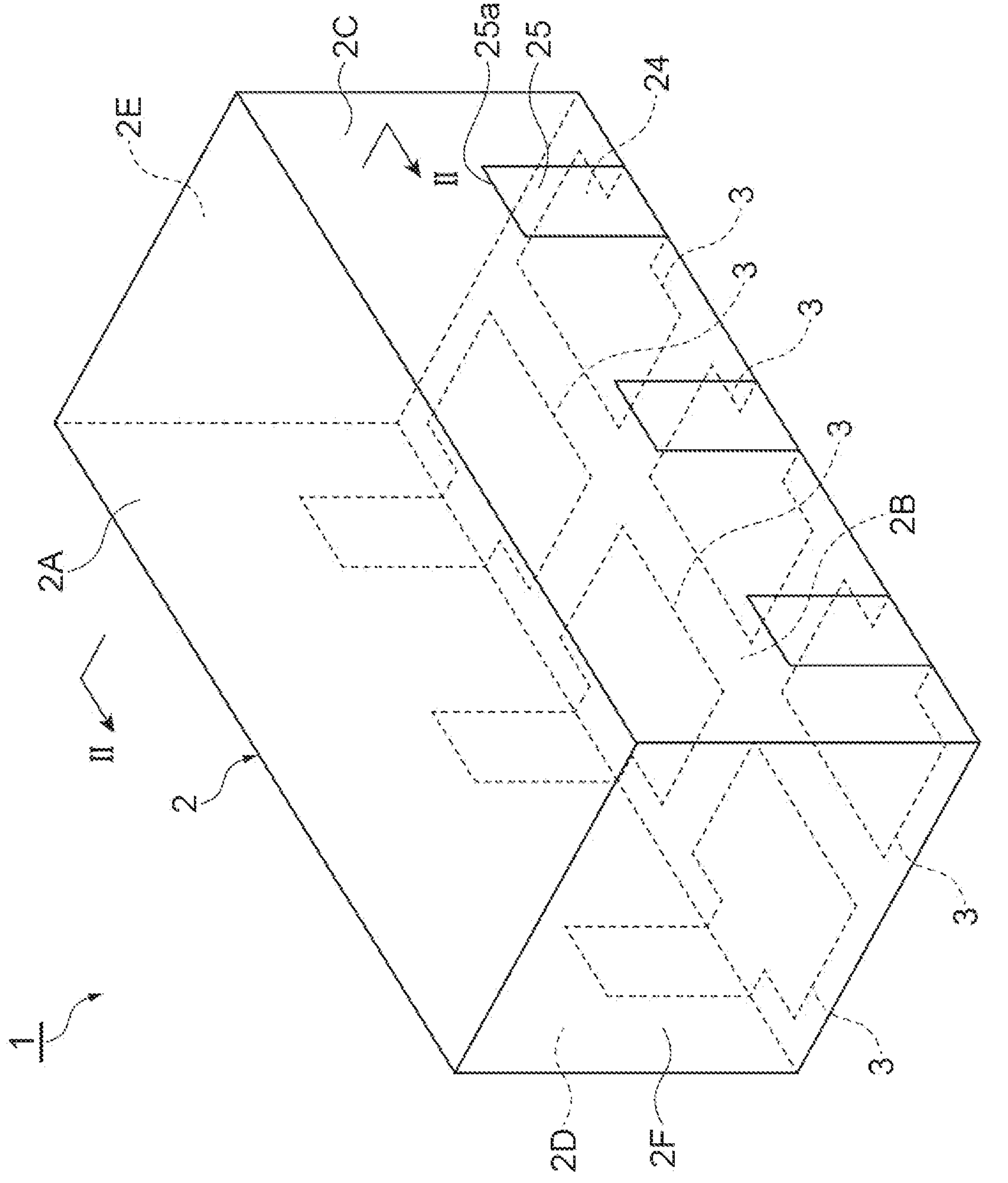
FIG. 1 is a perspective view of a laminated electronic component according to an embodiment of the present disclosure.

Hereinafter, an embodiment will be described in detail with reference to the accompanying drawings. In the description, the same reference numeral will be used for the same element or the element having the same function, and duplicate description thereof will be omitted.

Figure 2:
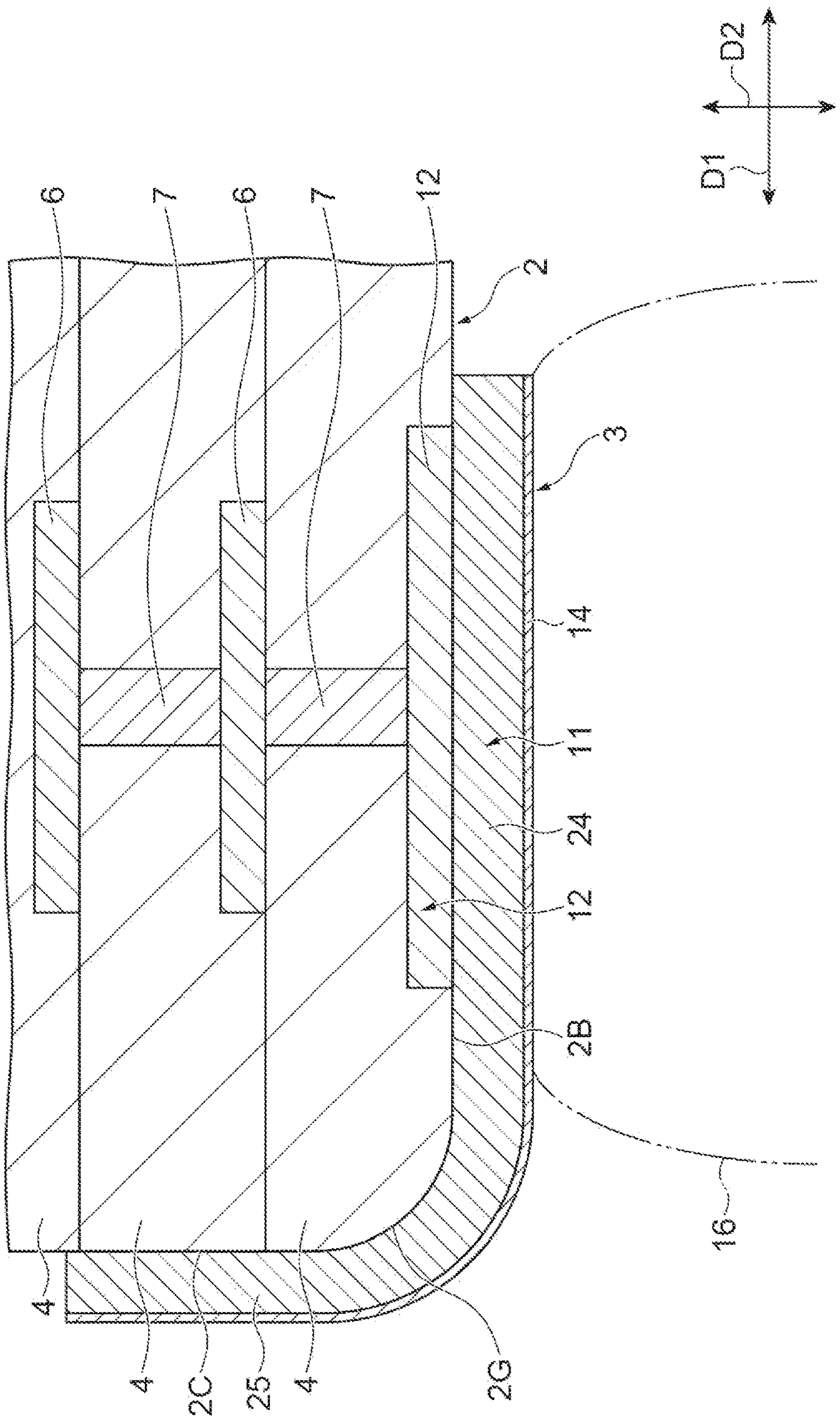
FIG. 2 is an enlarged cross-sectional view taken along line II-II illustrated in FIG. 1 in which the vicinity of a bottom surface electrode is enlarged.

FIG. 1 is a perspective view of a laminated electronic component 1 according to an embodiment of the present disclosure. FIG. 2 is an enlarged cross-sectional view taken along line II-II illustrated in FIG. 1 in which the vicinity of a bottom surface electrode 3 is enlarged. As illustrated in FIG. 1, the laminated electronic component 1 includes an element body 2 and a plurality of bottom surface electrodes 3.

As will be described below, the element body 2 is formed by laminating a plurality of insulating layers. The element body 2 has a rectangular parallelepiped shape. The rectangular parallelepiped shape includes a rectangular parallelepiped shape in which corner portions and ridge portions are chamfered, and a rectangular parallelepiped in which corner portions and ridge portions are rounded. The element body 2 has an upper surface 2A, a bottom surface 2B used as a mounting surface, and four side surfaces 2C, 2D, 2E, and 2F as outer surfaces thereof. The upper surface 2A and the bottom surface 2B face each other. The side surfaces 2C and 2D face each other. The side surfaces 2E and 2F face each other. The side surfaces 2C to 2F extend in a stacking direction of the upper surface 2A and the bottom surface 2B (a direction in which the insulating layers are laminated) and are adjacent to the upper surface 2A and the bottom surface 2B. In the element body 2, the upper surface 2A and the bottom surface 2B are located at both ends in the stacking direction. A material of the element body 2 (a material of the insulating layer) is not particularly limited, and for example, $Al_2O_3$, $SiO_2$, $2MgO{\cdot}SiO_2$, $xBaO{\cdot}yNdO{\cdot}zTIO_2$, $(Ca, Sr)TiO_2$ and the like may be adopted. In the specification, the terms "upper" and "bottom" are used for convenience of explanation, and do not limit a posture of the laminated electronic component 1 when the laminated electronic component 1 is used. For example, the laminated electronic component 1 may be mounted so that the upper surface 2A faces sideways or faces downward.

The bottom surface electrode 3 is an electrode provided on the bottom surface 2B of the element body 2. The bottom surface electrode 3 has a rectangular shape when seen in the stacking direction. In the example illustrated in FIG. 1, six bottom surface electrodes 3 are formed. The bottom surface electrodes 3 have the same shape as each other. The three bottom surface electrodes 3 are arranged in parallel in a longitudinal direction along the side surface 2C at a position closer to one side surface 2C which extends in the longitudinal direction. The other three bottom surface electrodes 3 are arranged in parallel in the longitudinal direction along the side surface 2D at a position closer to the other side surface 2D which extends in the longitudinal direction. The number of bottom surface electrodes 3 may be appropriately changed according to the use of the laminated electronic component 1. Other examples of the shape and the number of the bottom surface electrodes 3 will be described later.

As illustrated in FIG. 2, the element body 2 is configured by laminating the plurality of insulating layers 4. Further, a plurality of internal electrodes 6 and through hole conductors 7 are formed inside the element body 2. The element body 2 is formed by laminating a sheet of the insulating layer 4 having a conductor pattern of the internal electrode 6 formed on a surface thereof and then baking the sheet. The through hole conductor 7 is a conductor which passes through the insulating layer 4 per sheet and connects the internal electrodes 6 formed in other insulating layers 4. Further, the through hole conductor 7 connects the internal electrode 6 to the bottom surface electrode 3. A boundary portion between the insulating layers 4 is integrated to an extent that the boundary portion cannot be visually recognized.

Figure 3:
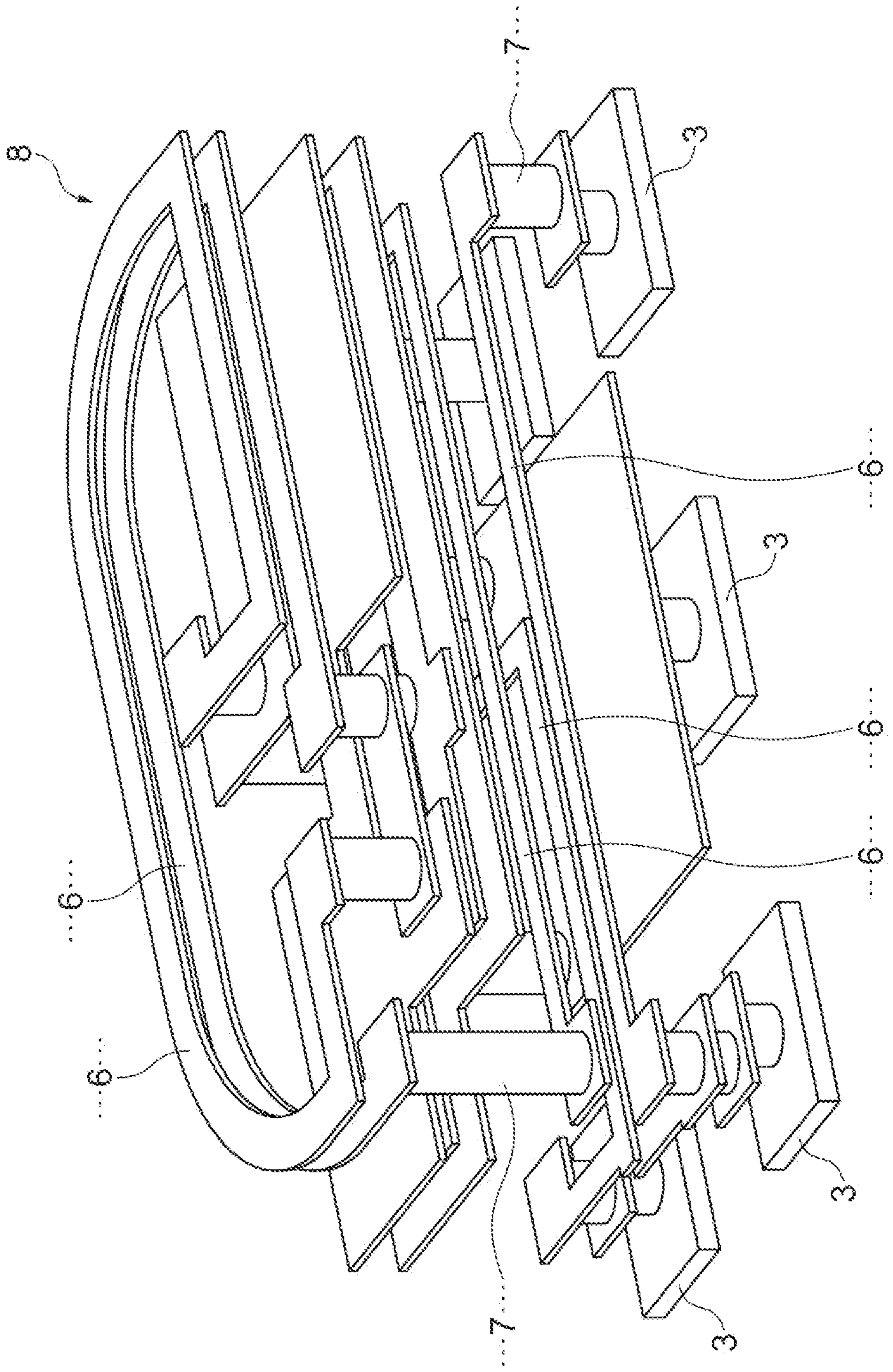
FIG. 3 illustrates an example of a structure of an internal electrode and a through hole conductor inside an element body.

FIG. 3 shows an example of a structure of the internal electrode 6 and the through hole conductor 7 inside the element body 2. As illustrated in FIG. 3, inside the element body 2, a plurality of internal electrodes 6 and a plurality of through hole conductors are three-dimensionally combined to form an electric circuit 8 exhibiting a predetermined function. In FIG. 3, an electric circuit 8 of a directional coupler is illustrated as an example. Each of the plurality of bottom surface electrodes 3 is electrically connected to the electric circuit 8. Thus, the electric circuit 8 and an external mounting substrate are connected via the bottom surface electrode 3 by connecting the bottom surface electrode 3 to the external mounting substrate.

Next, a configuration of the bottom surface electrode 3 will be described in detail. As illustrated in FIG. 2, the bottom surface electrode 3 includes a first electrode layer 11 and a second electrode layer 12. The first electrode layer 11 is a layer formed to be exposed to the outside from the bottom surface 2B. The first electrode layer 11 is formed by, for example, curing a conductive resin material, in which conductive powder is dispersed in a thermosetting resin, with respect to the element body 2 (and the second electrode layer 12) by a heat treatment after the element body 2 is baked. Specific examples of the resin material will be described below. The first electrode layer 11 is a layer which is electrically connected to the external mounting substrate via a solder 16. Therefore, a plating layer 14 for improving wettability of the solder is formed on an outer surface of the first electrode layer 11. The second electrode layer 12 is a layer formed on the element body 2 side from the first electrode layer 11. The second electrode layer 12 is formed in such a manner that it slips into the inside of the element body 2 and is formed by baking at the same time as the element body 2.

In the following description, in a cross-sectional view illustrated in FIG. 5, a direction in which the bottom surface electrode 3 spreads may be referred to as a first direction D1, and a direction along a thickness of the bottom surface electrode 3 may be referred to as a second direction D2.

The second electrode layer 12 expands in the element body 2 in the first direction D1. The second electrode layer 12 is disposed at a position separated from the side surface 2D in the first direction. A material of the second electrode layer 12 will be described. The second electrode layer 12 is made of a conductive material including glass and a sintered metal. Examples of the sintered metal include Ag, Cu, Au, Pt, Pd and alloys thereof. Further, the second electrode layer 12 may contain a trace metal oxide as another inorganic component. A glass softening point of the second electrode layer 12 is 810 to 860° C. A content of glass in the second electrode layer 12 is 3.8 to 10.0 wt %. In this way, sintering matching with the element body 2 can be obtained by increasing the softening point of the second electrode layer 12 and reducing an addition amount of glass. The sintering matching is to achieve both an effect of suppressing bending of the element body 2 and the high denseness (electrical characteristics of products, suppression of intrusion of a plating solution, and the like) of the electrode.

The first electrode layer 11 is a resin electrode laminated to cover the second electrode layer 12. In the resin electrode, conductive powder is contained (dispersed) in a resin. Examples of a resin material of the resin electrode include a phenol resin, an acrylic resin, a silicone resin, an epoxy resin, a polyimide resin, and the like. As a material of the conductive powder of the resin electrode, Ag, Cu and the like are adopted. The first electrode layer 11 has a bottom surface portion 24 formed on the bottom surface 2B and a stretched portion 25 extending to the side surface 2C. The bottom surface portion 24 is a portion which covers the second electrode layer 12 from the bottom side and expands on the bottom surface 2B in the first direction D1. The bottom surface portion 24 reaches a corner portion 2G between the side surface 2C and the bottom surface 2B. The stretched portion 25 is a portion which is electrically connected to the bottom surface portion 24 and extends upward from the bottom surface 2B along the side surface 2C. The stretched portion 25 is connected to the bottom surface portion 24 at the corner portion 2G.

Figure 4:
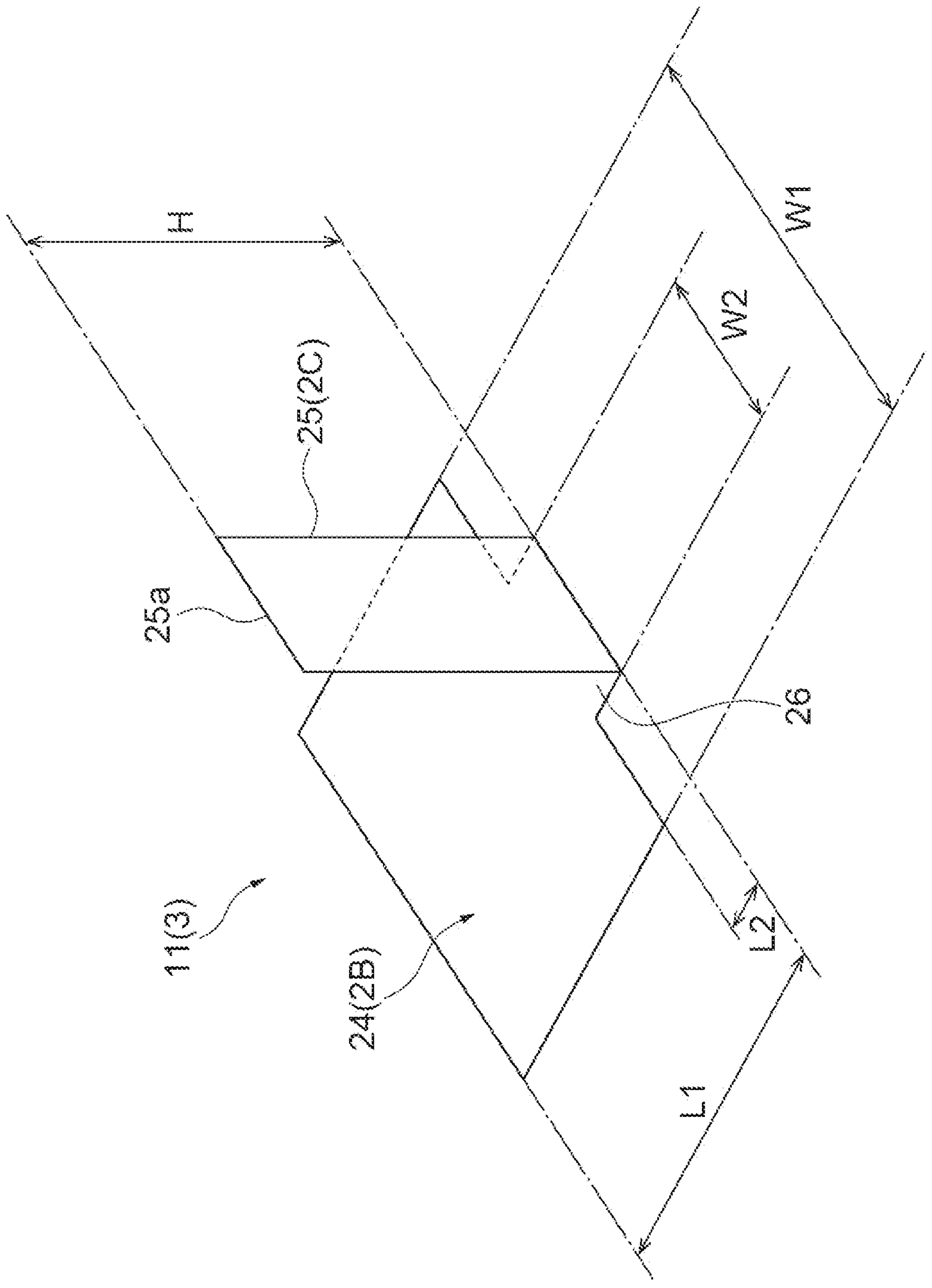
FIG. 4 is a schematic perspective view of a first electrode layer.

The first electrode will be described in more detail with reference to FIG. 4. In the following description, a word "width" is used with reference to a state when seen from the side surface 2C. The bottom surface portion 24 has a quadrangular shape having four sides to be parallel to sides of the bottom surface 2B (refer to also FIG. 1). The stretched portion 25 has a quadrangular shape having four sides to be parallel to sides of the side surface 2C (refer to also FIG. 1). The bottom surface portion 24 has a width dimension W1 and a length dimension L1 from the side surface 2C toward the inside of the element body 2. The stretched portion 25 has a width dimension W2 and a height dimension H from the bottom surface 2B. A narrow portion 26 having the width dimension W2 is formed in a region having a length dimension L2 in the vicinity of the side surface 2C.

The width dimension W2 in the stretched portion 25 is smaller than the width dimension W1 of the first electrode layer 11 on the bottom surface 2B. Specifically, the width dimension W1 is set in a range of 0.1 to 1.0 mm. On the other hand, the width dimension W2 is preferably set to 30% or more of the width dimension W1, and more preferably 40% or more. The width dimension W2 is preferably set to 90% or less of the width dimension W1, and more preferably 70% or less. The stretched portion 25 is disposed at a center position within a range of the width dimension W1 with respect to the bottom surface portion 24, but may be disposed anywhere. The length dimension L1 of the bottom surface portion 24 is set in a range of 0.15 to 0.50 mm. The length dimension L2 of the narrow portion 26 is set in a range of 0.01 to 0.20 mm.

The stretched portion 25 is disposed on the side surface 2C (2D) at a position separated from the upper surface 2A facing the bottom surface 2B (refer to FIG. 1). That is, an upper end portion 25*a* of the stretched portion 25 does not reach the upper surface 2A, and the stretched portion 25 is cut off in the middle of the side surface 2C. The height dimension H of the stretched portion 25 is not particularly limited, but is preferably 30% or more and more preferably 40% or more of the dimension in the stacking direction of the element body 2 from the viewpoint of improving a plating property. The upper limit of the height dimension H is not particularly limited and may be 100% or less of a dimension of the element body 2 in the stacking direction. From the viewpoint of suppressing the height dimension H and reducing an area of the stretched portion 25, the height dimension H of the stretched portion 25 is preferably 100% or less and more preferably 70% or less of the dimension of the element body 2 in the stacking direction. A thickness of each of the bottom surface portion 24 and the stretched portion 25 is set to 5 to 50 μm. The thickness of the bottom surface portion 24 and the thickness of the stretched portion 25 may be the same as or different from each other.

Figure 5:
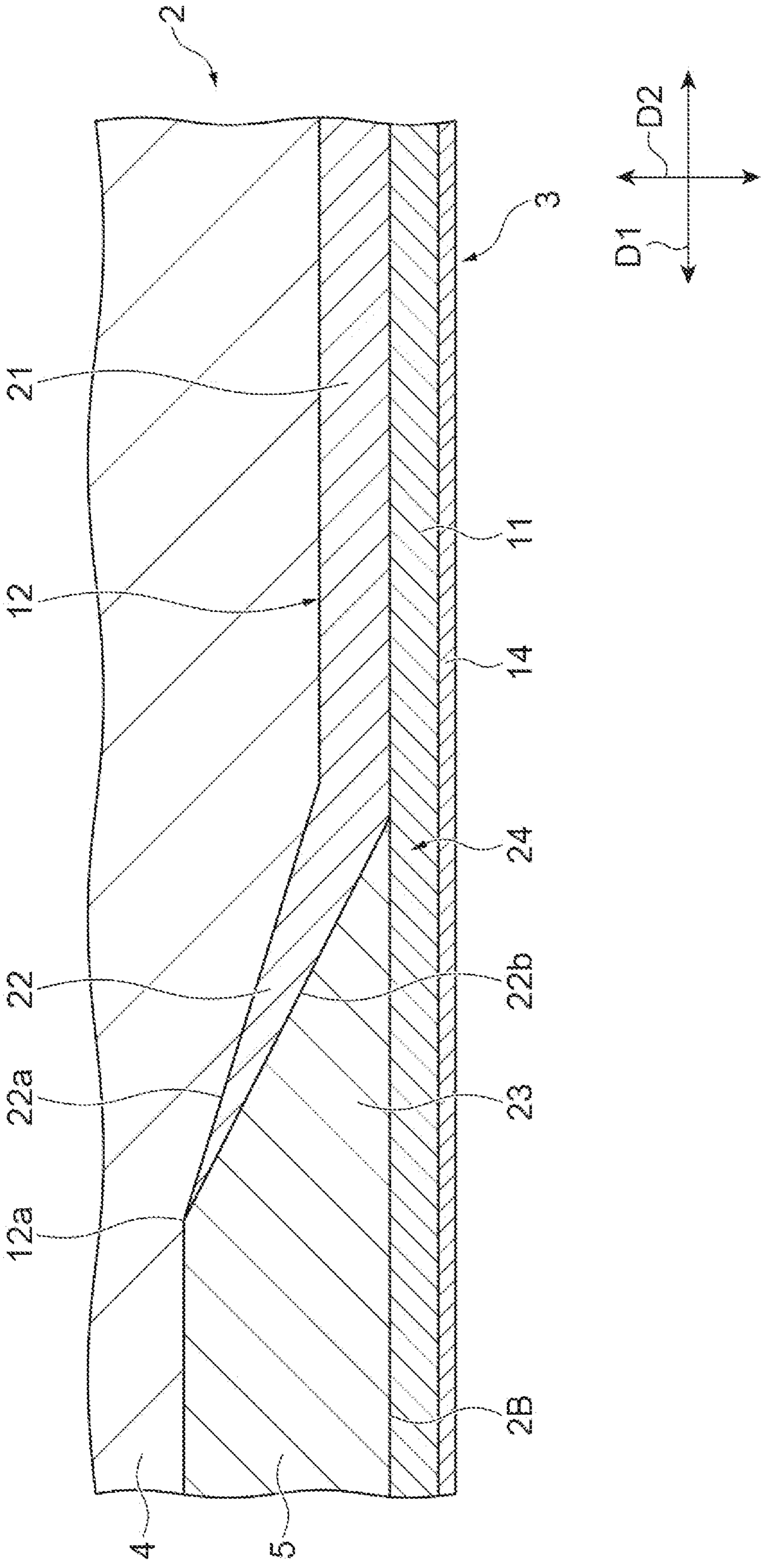
FIG. 5 is an enlarged cross-sectional view illustrating a configuration in the vicinity of a bottom surface electrode when an overcoat layer is formed.

As shown in FIG. 5, an edge portion 22 of the second electrode layer 12 may be covered with an overcoat layer 5 which is a part of the element body 2. Specifically, the second electrode layer 12 has a main body portion 21 and the edge portion 22 formed on the outer peripheral side in the first direction D1. The edge portion 22 of the second electrode layer 12 is covered with the overcoat layer 5 which is a part of the element body 2. An upper surface 22*a* of the edge portion 22 in the second direction D2 comes into contact with the insulating layer 4 of the element body 2. A bottom surface 22*b* of the edge 22 in the second direction D2 comes into contact with the overcoat layer 5 of the element body 2. In this way, the edge portion 22 slips into the inside of the element body 2 in such a manner that it is sandwiched between the insulating layer 4 and the overcoat layer 5. The edge portion 22 is formed to be inclined upward and tapered in the second direction D2 from the main body portion 21 toward the outer peripheral side in the first direction D1. Therefore, the bottom surface 22*b* of the edge portion 22 goes away upward from the bottom surface 2B as it goes away from the main body portion 21 in the first direction D1.

With the above-described configuration, a thickness of the overcoat layer 5 in contact with the surface 22*b* of the edge portion 22 increases from the main body portion 21 toward the outer peripheral side in the first direction D1. As described above, the overcoat layer 5 has a region in which the overcoat layer 5 slips into the bottom side of the edge portion 22 and supports the surface 22*a*. The region constitutes a covering portion 23 which covers the edge portion 22. The covering portion 23 tapers toward the main body portion 21 in the second direction D2. The main body portion 21 of the second electrode layer 12 is configured to be exposed from the covering portion 23. The upper surface 22*a* and the bottom surface 22*b* intersect each other at a position of an end portion 12*a* of the second electrode layer 12 in the first direction D1.

The bottom surface portion 24 of the first electrode layer 11 is laminated on the second electrode layer 12 with the overcoat layer 5 interposed therebetween. As described above, the overcoat layer 5 covers the edge portion 22 of the second electrode layer 12 in the covering portion 23. The first electrode layer 11 is formed to cover the main body portion 21 of the second electrode layer 12 and the outer surface (that is, the bottom surface 2B) of the overcoat layer 5 from the bottom side. Therefore, the covering portion 23 of the overcoat layer 5 is disposed to be sandwiched between the bottom surface 22*b* of the edge portion 22 of the second electrode layer 12 and the first electrode layer 11. Even when the overcoat layer 5 is formed on the element body 2, the first electrode layer 11 has the stretched portion 25 as in FIG. 2.

The shape, size, and arrangement of the bottom surface electrode 3 on the bottom surface 2B are not particularly limited, and for example, the configurations illustrated in FIGS. 6A, 6B, 8A and 8B may be adopted. Further, the configuration of the stretched portion 25 of each of the bottom surface electrodes 3 can be appropriately changed. FIGS. 6A, 6B, 8A and 8B illustrate a bottom view illustrating the bottom surface 2B in the center, a side view illustrating the side surface 2D extending in the longitudinal direction below the bottom view, and a side view illustrating the side surface 2E extending in a transverse direction on the right side of the bottom view. An exterior of the side surface 2F is the same as that of the side surface 2E, and the exterior of the side surface 2C is the same as that of the side surface 2D. As illustrated in FIGS. 6A, 6B, 8A and 8B, small bottom surface electrodes 3C and 3D are formed in the vicinity of the side surfaces 2C and 2D. Large bottom surface electrodes 3E and 3F are formed in the vicinity of the side surfaces 2E and 2F.

Figure 6B:
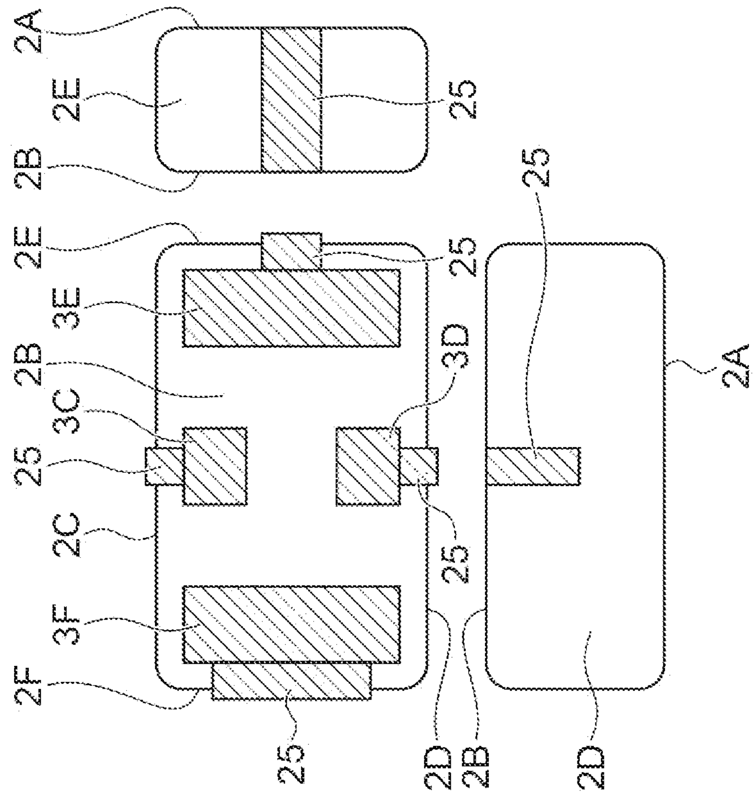
FIGS. 6A and 6B are schematic views illustrating a variation in a stretched portion.
Figure 6A:
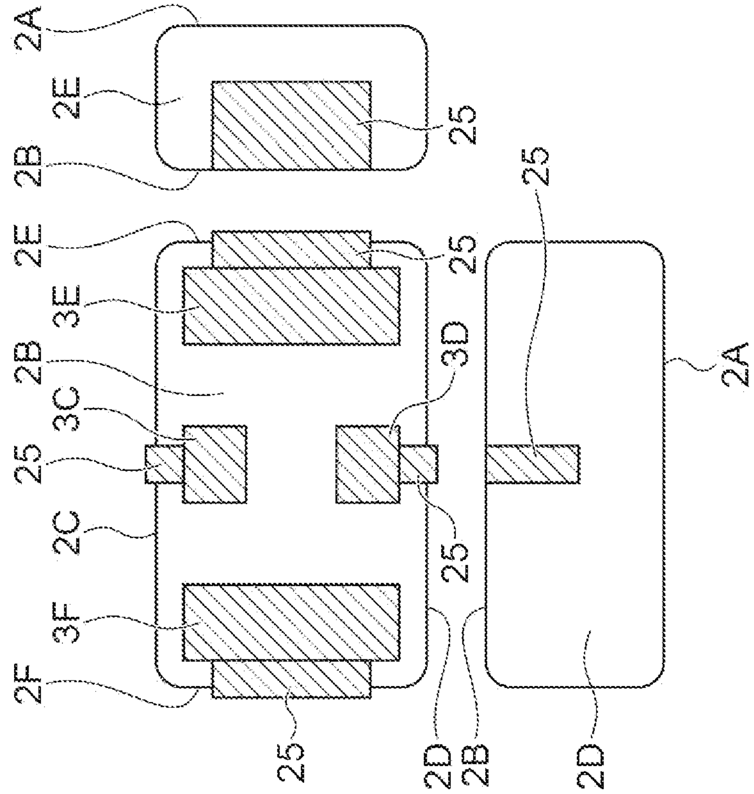

In the example illustrated in FIG. 6A, the stretched portions 25 which do not reach the upper surface 2A from the bottom surface electrodes 3C and 3D are formed on the side surfaces 2C and 2D. The wide stretched portions 25 which do not reach the upper surface 2A from the bottom surface electrodes 3E and 3F are formed on the side surfaces 2E and 2F. In the example illustrated in FIG. 6B, the stretched portions 25 which do not reach the upper surface 2A from the bottom surface electrodes 3C and 3D are formed on the side surfaces 2C and 2D. The narrow stretched portions 25 which reach the upper surface 2A from the bottom surface electrodes 3E and 3F are formed on the side surfaces 2E and 2F.

Figure 7B:
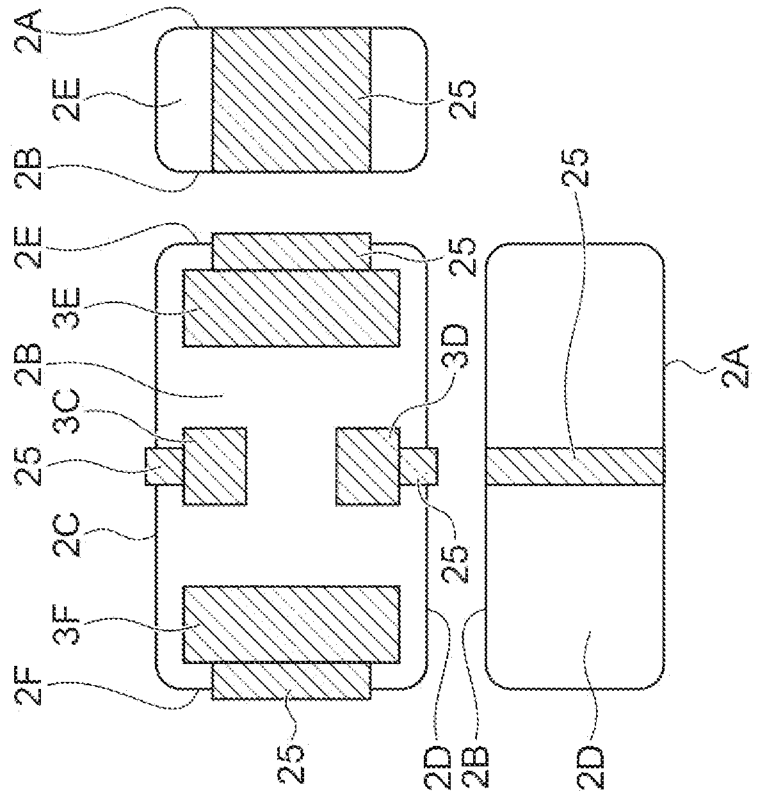
FIGS. 7A and 7B are schematic views illustrating a variation in the stretched portion.
Figure 7A:
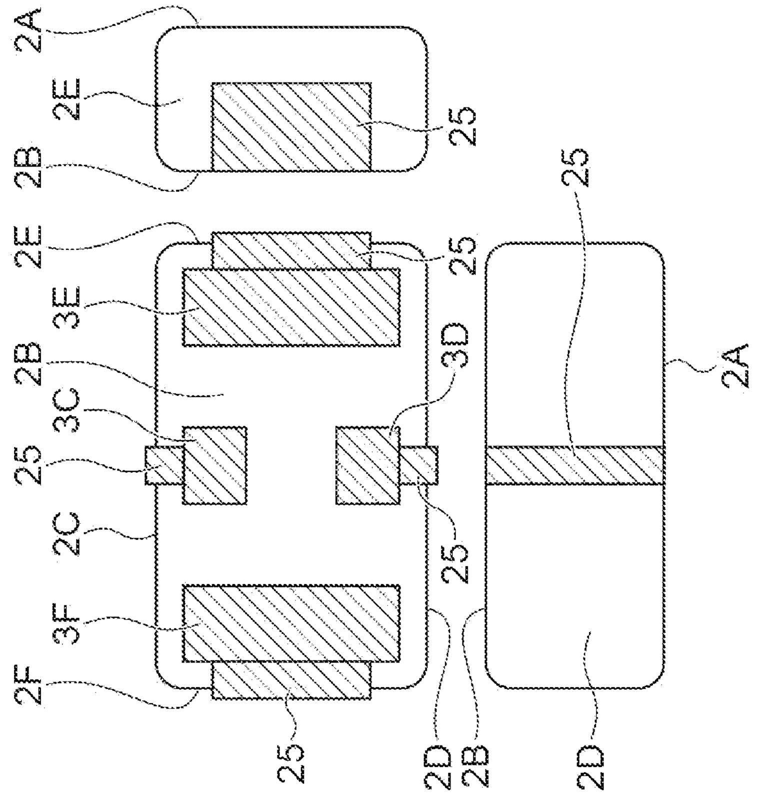

In the example illustrated in FIG. 7A, the stretched portions 25 which do not reach the upper surface 2A from the bottom surface electrodes 3C and 3D are formed on the side surfaces 2C and 2D. The wide stretched portions 25 which do not reach the upper surface 2A from the bottom surface electrodes 3E and 3F are formed on the side surfaces 2E and 2F. In the example illustrated in FIG. 7B, the stretched portions 25 which reach the upper surface 2A from the bottom surface electrodes 3C and 3D are formed on the side surfaces 2C and 2D. The narrow stretched portions 25 which reach the upper surface 2A from the bottom surface electrodes 3E and 3F are formed on the side surfaces 2E and 2F.

Figure 8B:
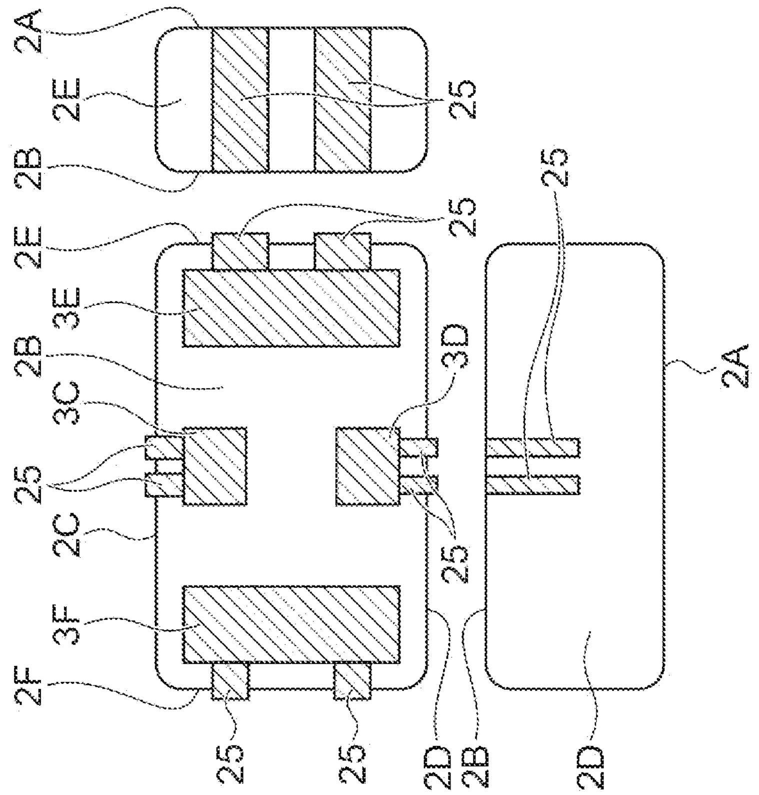
FIGS. 8A and 8B are schematic views illustrating a variation in the stretched portion.
Figure 8A:
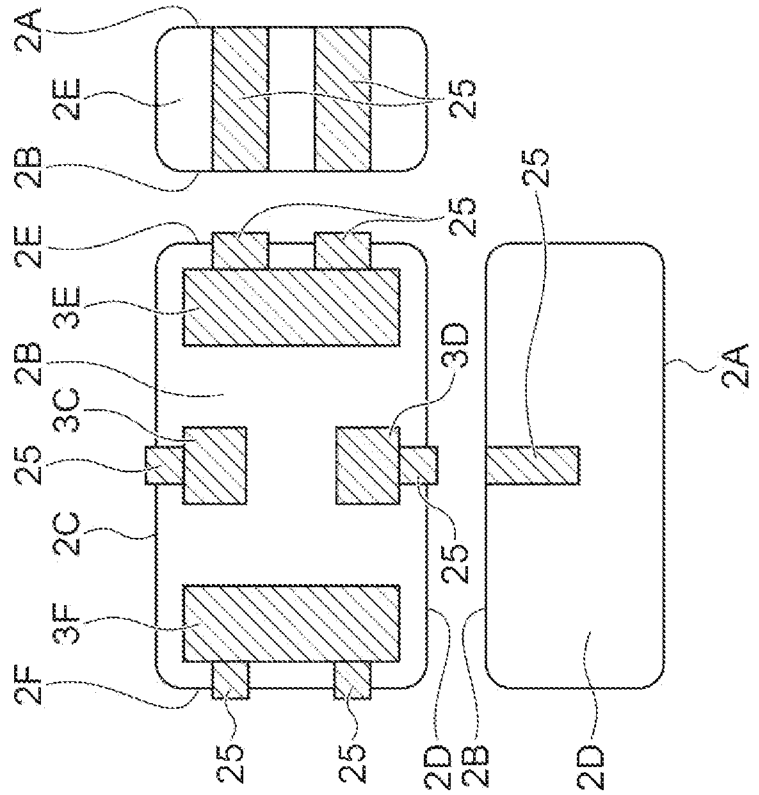

In the example illustrated in FIG. 8A, the stretched portions 25 which do not reach the upper surface 2A from the bottom surface electrodes 3C and 3D are formed on the side surfaces 2C and 2D. The narrow stretched portions 25 divided into two which reach the upper surface 2A from the bottom surface electrodes 3E and 3F are formed on the side surfaces 2E and 2F. In the example illustrated in FIG. 8B, the stretched portions 25 divided into two which do not reach the upper surface 2A from the bottom surface electrodes 3C and 3D are formed on the side surfaces 2C and 2D. The narrow stretched portions 25 divided into two which reach the upper surface 2A from the bottom surface electrodes 3E and 3F are formed on the side surfaces 2E and 2F.

Figure 9:
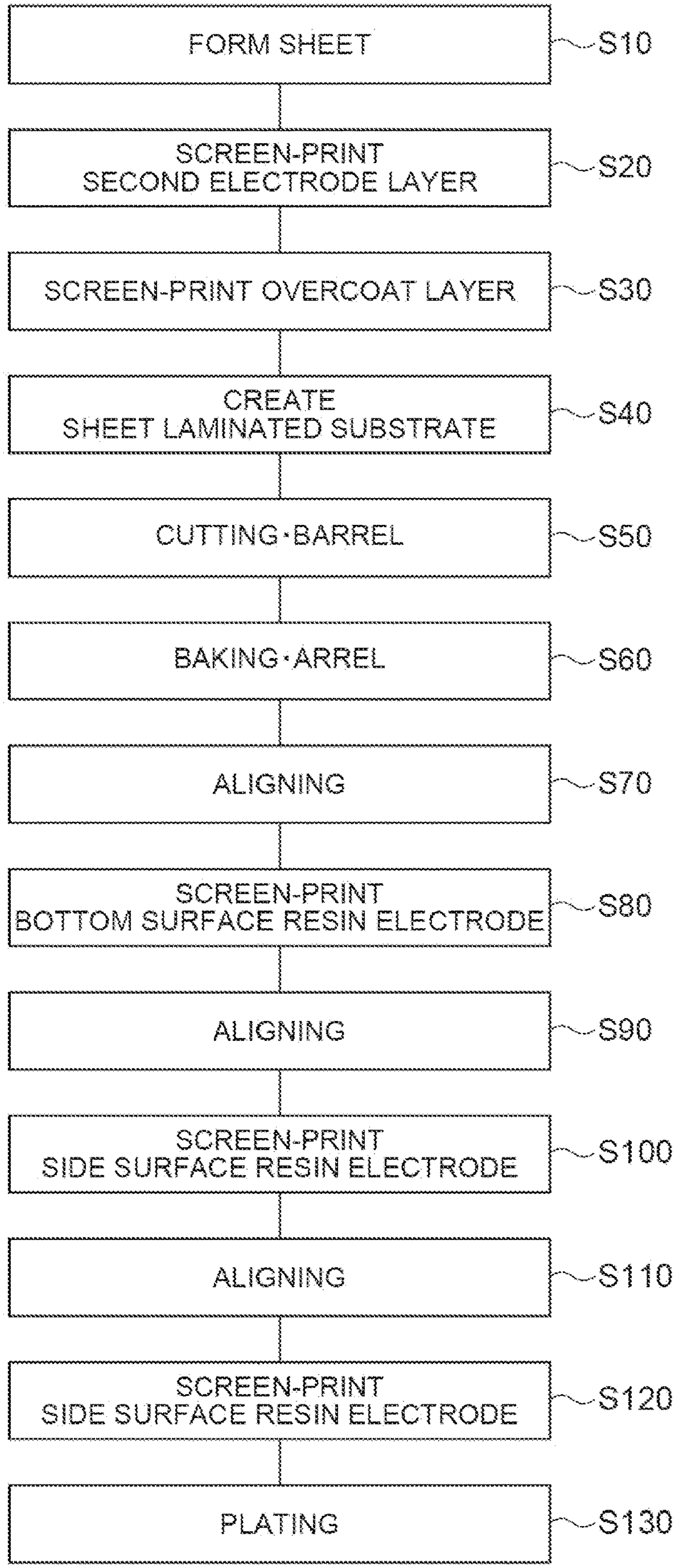
FIG. 9 is a process diagrams showing a method for manufacturing a laminated electronic component.
Figures 10A, 10B, 10C:
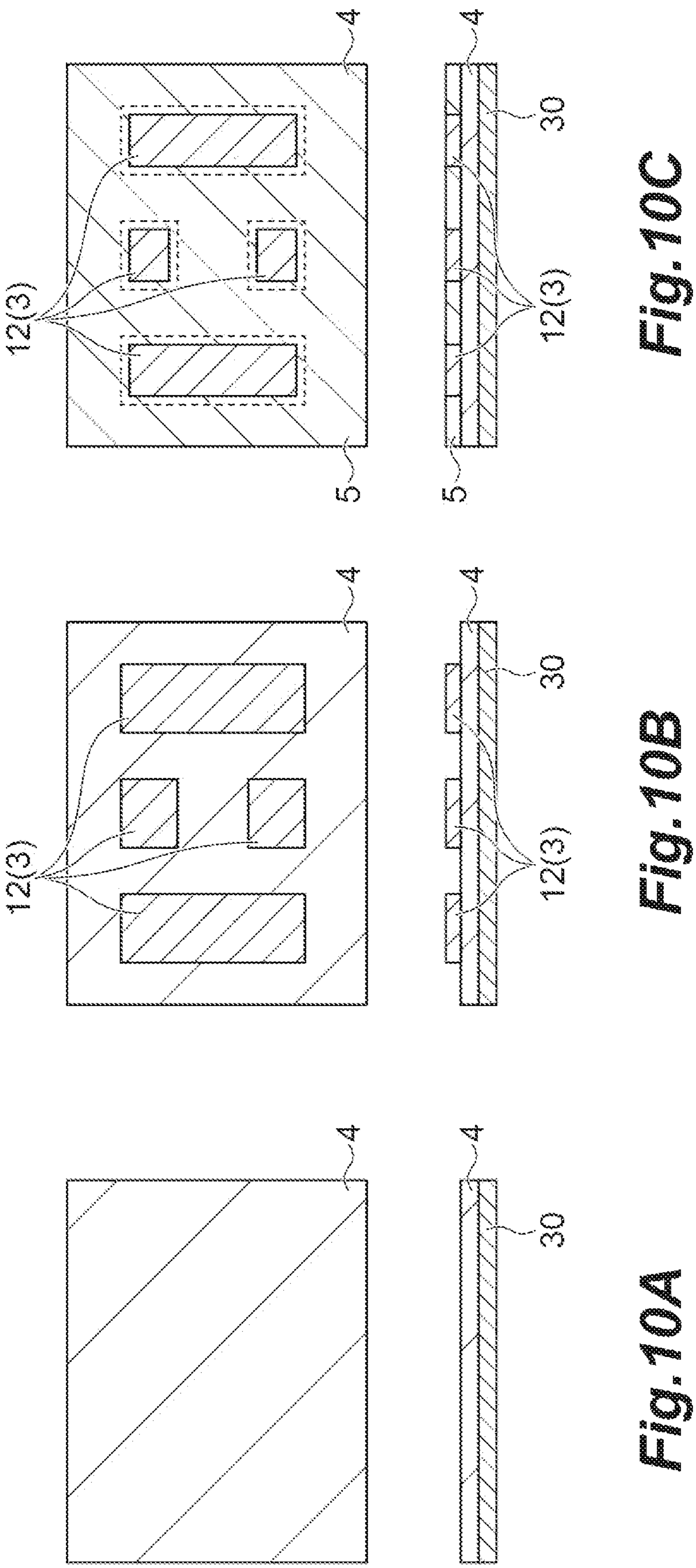
FIGS. 10A, 10B, and 10C are schematic views illustrate a state at each of stages of the method for manufacturing a laminated electronic component.
Figure 11A:
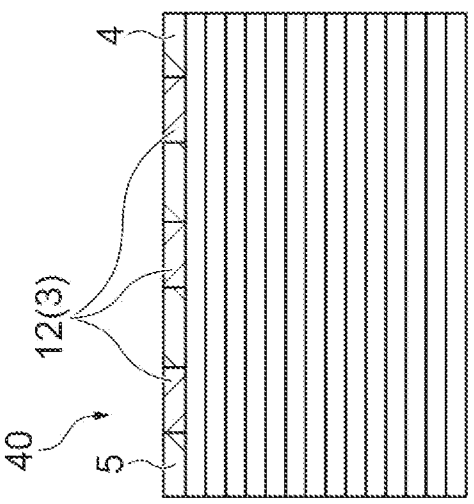
FIGS. 11A, 11B, and 11C are schematic views illustrate the state at each of the stages of the method for manufacturing a laminated electronic component.
Figure 11B:
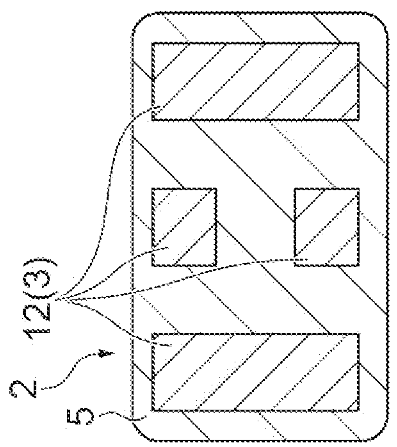
Figure 11C:
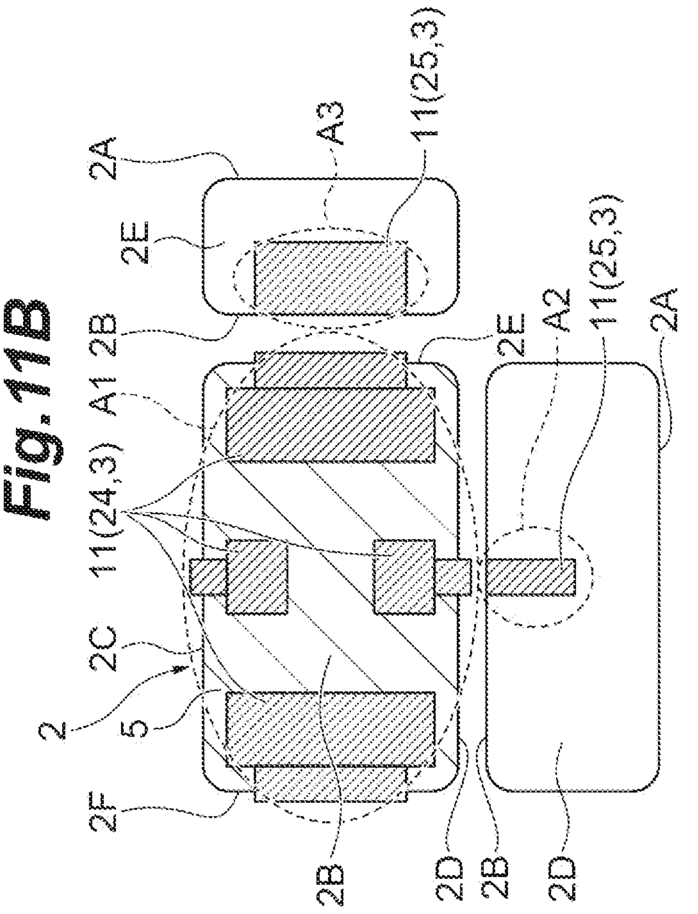

Next, a method for manufacturing the laminated electronic component 1 will be described with reference to FIG. 9 to FIGS. 11A, 11B, and 11C. FIG. 9 is a process diagram illustrating the method for manufacturing the laminated electronic component 1. FIGS. 10A, 10B, 10C, 11A, 11B and 11C are schematic views illustrating a state at each of stages of the method for manufacturing the laminated electronic component 1. FIGS. 10A, 10B, 10C, 11A, 11B and 11C illustrate an example of a case of four bottom surface electrodes 3. The upper views of FIGS. 10A, 10B and 10C illustrate plan views, and the lower views illustrate side views. FIG. 11C illustrates the same representations as FIGS. 6A and 6B to FIGS. 8A and 8B. FIG. 9 to FIGS. 11A, 11B, and 11C show a manufacturing method when the overcoat layer 5 is formed, as corresponding to FIG. 5.

As illustrated in FIG. 9, first, a process of forming a sheet of the insulating layer 4 is performed (Step S10). In this process, the sheet is formed by applying a paste constituting the insulating layer 4 onto a base sheet 30 such as a PET film (refer to FIG. 10A). Next, a process of forming the second electrode layer 12 of the bottom surface electrode 3 by performing screen printing on the sheet of the insulating layer 4 is performed (Step S20). In this process, the paste is printed on the outer surface of the insulating layer 4 by the screen printing in a shape corresponding to the second electrode layer 12 (refer to FIG. 10B). At this timing, the internal electrode 6 is printed on the sheet of the other insulating layer 4. Next, a process of forming the overcoat layer 5 by performing screen printing on the outer surface of the insulating layer 4 is performed (Step S30). In this process, the paste is printed on the outer surface of the insulating layer 4 by the screen printing in a shape corresponding to the overcoat layer 5 (refer to FIG. 10C). At this time, the overcoat layer 5 is printed to cover the edge portion of the second electrode layer 12 and is pressed after the printing.

Next, a process of creating a sheet laminated substrate 40, which is the element body 2 before sintering, by laminating the sheet of the insulating layer 4 after the printing is performed (Step S40). In the sheet laminated substrate 40, each of the insulating layers 4 is laminated so that the overcoat layer 5 is the outermost layer (refer to FIG. 11A). Next, a process of cutting the sheet laminated substrate 40 to a predetermined size with a dicer or a knife and performing chamfering with a green barrel is performed (Step S50). Next, a process of sintering the sheet laminated substrate 40 to create the element body 2 and performing a barrel treatment after baking is performed (Step S60). Due to these processes, the element body 2 having an angle R formed is formed (refer to FIG. 11B).

Next, a process of aligning the element body 2 for screen printing on the bottom surface 2B is performed (Step S70). Then, a process of forming the bottom surface portion 24 of the first electrode layer 11 by performing screen printing of the resin electrode on the bottom surface 2B of the element body 2 is performed (Step S80). In this process, a process of forming the bottom surface portion 24 of the first electrode layer 11 on the bottom surface 2B by screen printing to cover the second electrode layer 12 is performed (refer to "A1" in FIG. 11C). Next, a process of aligning the element body 2 for screen printing on the side surfaces 2C and 2D is performed (Step S90). Then, a process of forming the stretched portion 25 of the first electrode layer 11 by screen printing the resin electrode on the side surfaces 2C and 2D of the element body 2 is performed (Step S100). In this process, a process of forming the stretched portion 25 of the first electrode layer 11 on the side surfaces 2C and 2D by screen printing is performed (refer to "A2" in FIG. 11C). Next, a process of aligning the element body 2 for screen printing on the side surfaces 2E and 2F is performed (Step S110). Then, a process of forming the stretched portion 25 of the first electrode layer 11 by screen printing the resin electrode on the side surfaces 2E and 2F of the element body 2 is performed (Step 120). In this process, a process of forming the stretched portion 25 of the first electrode layer 11 on the side surfaces 2E and 2F by screen printing is performed (refer to "A3" in FIG. 11C). The first electrode layer 11 is formed by curing a conductive resin material due to a heat treatment. Next, a process of forming the plating layer 14 is performed by subjecting the outer surface of the first electrode layer 11 to a plating treatment (Step S130).

When the laminated electronic component 1 having no overcoat layer 5 is manufactured, Step S30 is omitted. Thus, in the state illustrated in FIG. 10B, the second electrode layer is pressed to enter the inside of the insulating layer 4.

Next, an operation and effect of the laminated electronic component 1 according to the present embodiment will be described.

In the laminated electronic component 1, the bottom surface electrode 3 includes the first electrode layer 11 and the second electrode layer 12 formed on the element body 2 side from the first electrode layer 11. Here, the first electrode layer 11 is a resin electrode which is laminated to cover the second electrode layer 12. In this way, the stress on the bottom surface electrode 3 can be relaxed using the resin electrode as the bottom surface electrode 3. The first electrode layer 11 has the stretched portions 25 which extend to the side surfaces 2C, 2D, 2E, and 2F. Therefore, the plating property can be improved by increasing an electrode area of the resin electrode. Specifically, when electroplating is performed, the electrode of the laminated electronic component 1 comes into contact with the cathode via a metal medium and is energized in a solution of a barrel. That is, as a contact probability between the media and the electrode increases, the frequency of energization also increases, and thus plating efficiency is high. When the resin electrode is used, a proportion of a non-metal (a resin) in the electrode surface increases, and thus the plating efficiency tends to decrease, but in the present embodiment, since the electrode area can be increased by the stretched portion 25, the plating efficiency can be improved.

Further, the width dimension W2 in the stretched portion 25 is smaller than the width dimension W1 of the first electrode layer 11 on the bottom surface 2B. That is, the width dimension W1 of the first electrode layer 11 on the bottom surface 2B in which the solder 16 is required is larger than the width dimension W2 on the stretched portions 25 of the side surfaces 2C, 2D, 2E, and 2F. Therefore, it is possible to suppress attraction of the solder 16 on the bottom surface 2B to the stretched portions 25 side of the side surfaces 2C, 2D, 2E, and 2F, and thus a decrease in an amount of solder on the bottom surface 2B can be suppressed. Therefore, since a distance between the bottom surface electrode 3 and a mounting substrate can be secured by a thickness of the solder 16, the stress from the mounting substrate to the bottom surface electrode 3 can be suppressed. Thus, it is possible to suppress the generation of cracks in the element body 2 while ensuring the plating property of the bottom surface electrode 3.

The stretched portions 25 may be disposed on the side surfaces 2C, 2D, 2E, and 2F at positions separated from the upper surface 2A facing the bottom surface 2B. In this case, since the stretched portion 25 is in a state in which it does not reach the upper surface 2A and is interrupted, an area of the stretched portion 25 can be further reduced. Therefore, the amount of solder 16 attracted toward the side surfaces 2C, 2D, 2E, and 2F by the stretched portion 25 can be further reduced.

The edge portion 22 of the second electrode layer 12 may be covered with the overcoat layer 5 which is a part of the element body 2. Thus, when stress is concentrated in the vicinity of the end portion of the bottom surface electrode 3, the stress is dispersed to the overcoat layer 5 via a boundary portion between the first electrode layer 11 and the overcoat layer 5.

Next, with reference to FIG. 12, a thermal shock test for the laminated electronic components according to the example and the comparative example will be described. As a laminated electronic component according to the comparative example, a laminated electronic component in which the first electrode layer 11 is omitted was prepared. Therefore, the stretched portion 25 is not formed in the comparative example. Further, in the example, as illustrated in FIG. 5, a structure in which a part of the overcoat layer 5 is sandwiched between the bottom surface portion 24 of the first electrode layer 11 of the resin electrode and the second electrode layer 12 is obtained. Further, the stretched portion 25 as shown in FIG. 2 is stretched on the side surface. The laminated electronic components are connected to a substrate via solders, and temperature is repeatedly raised and lowered at −40° C. to 125° C. At this time, the components are held at each temperature for 30 minutes. A thermal shock test was carried out under such conditions. The generation of substrate cracks (cracks in the element body 2), terminal breakage (peeling from the bottom surface electrode of the plating layer, and the like), and solder cracks was observed for eight bottom surface electrodes. The number of defective bottom surface electrodes out of 8 was counted. Test results are illustrated in FIG. 12.

As illustrated in FIG. 12, in the comparative example, the substrate cracks and the terminal breakages were confirmed at each number of cycles. As the substrate cracks, cracks which extend upward from stress concentration portions of the corners of the bottom surface electrode and the insulating layer and destroy the insulating layer, and cracks which extend from stress concentration portions along a boundary portion between the bottom surface electrode and the insulating layer were observed. As the terminal breakage, peeling between the electrode and the plating was confirmed. In addition, in the comparative example, it was confirmed that more solder cracks than in the examples were generated. As the solder cracks, cracks which destroy the inside of the solder were confirmed. On the other hand, in the example, it was confirmed that the substrate crack and the terminal breakage could be prevented even with a high number of cycles. It was also confirmed that the generation of solder cracks could be suppressed at a low number of cycles.

EXPLANATION OF REFERENCES

1 Laminated electronic component
2 Element body
3 Bottom surface electrode
5 Overcoat layer
11 First electrode layer
12 Second electrode layer
25 Stretched portion

What is claimed is:

1. A laminated electronic component comprising:

an element body formed by laminating an insulating layer and having a bottom surface used as a mounting surface, and side surfaces configured to extend to intersect the bottom surface; and a bottom surface electrode formed on the bottom surface of the element body, wherein the bottom surface electrode includes a first electrode layer and a second electrode layer, such that the first electrode layer is formed on an exterior surface of the element body, the first electrode layer is a resin electrode laminated to cover the second electrode layer entirely, and has a stretched portion configured to extend to the side surface, a width dimension of the stretched portion is smaller than a width dimension of the first electrode layer on the bottom surface, the element body comprises an overcoat layer as an outermost layer that defines the bottom surface, an edge portion of the second electrode layer is covered with the overcoat layer, the overcoat layer is interposed between the edge portion of the second electrode layer and the first electrode layer, and the first electrode layer is connected to a portion of the second electrode layer that is exposed at the bottom surface.

2. The laminated electronic component according to claim 1, wherein the stretched portion is disposed on the side surface at a position separated from an upper surface facing the bottom surface.

* * * * *